May 31, 1966  B. B. STEWART ETAL  3,253,780
CALCULATOR

Filed June 8, 1965  6 Sheets-Sheet 1

INVENTORS
BURCH B. STEWART
ROBERT J. CLIFFORD
BY Rudolph J. Jurick
ATTORNEY

May 31, 1966  B. B. STEWART ETAL  3,253,780
CALCULATOR

Filed June 8, 1965  6 Sheets-Sheet 2

INVENTORS
BURCH B. STEWART
ROBERT J. CLIFFORD
BY *Rudolph J. Jurick*
ATTORNEY

May 31, 1966  B. B. STEWART ETAL  3,253,780
CALCULATOR
Filed June 8, 1965
6 Sheets-Sheet 4
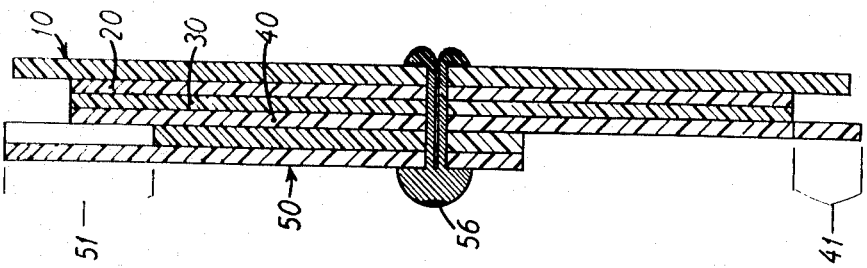
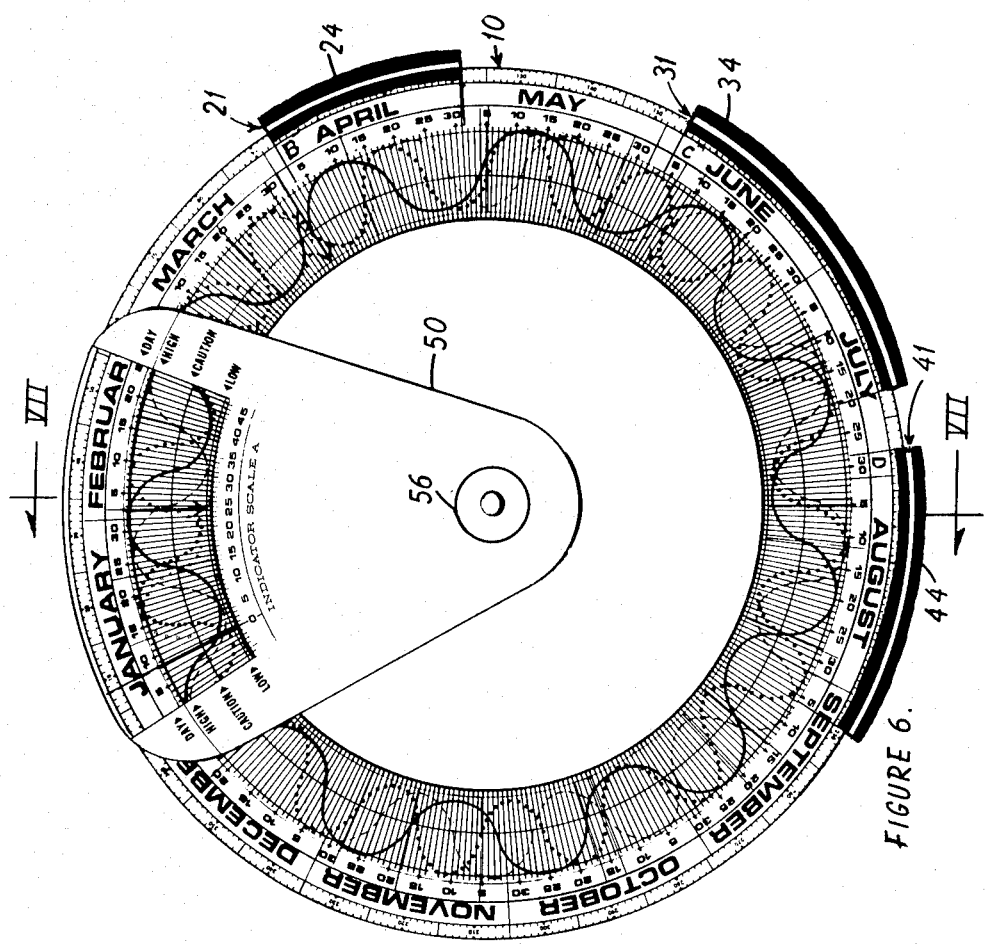
INVENTORS
BURCH B. STEWART
ROBERT J. CLIFFORD
BY *Rudolph J. Lucrich*
ATTORNEY May 31, 1966     B. B. STEWART ETAL     3,253,780

CALCULATOR

Filed June 8, 1965     6 Sheets-Sheet 5

INVENTORS
BURCH B. STEWART
ROBERT J. CLIFFORD

BY *Rudolph J. Jurick*

ATTORNEY

May 31, 1966  B. B. STEWART ETAL  3,253,780
CALCULATOR

Filed June 8, 1965  6 Sheets-Sheet 6

INVENTORS
BURCH B. STEWART
ROBERT J. CLIFFORD
BY Rudolph L. Scirick
ATTORNEY

United States Patent Office 3,253,780
Patented May 31, 1966

3,253,780
CALCULATOR
Burch B. Stewart, 401 Pitney Place, Morristown, N.J., and Robert J. Clifford, 73 Park Ave., Madison, N.J.
Filed June 8, 1965, Ser. No. 462,177
8 Claims. (Cl. 235—78)

This invention relates to a calculator and more particularly to a calculator of novel construction for graphically displaying the inter-relationship of a pluraltiy of periodically-varying factors when taken from a selected point of reference.

A calculator made in accordance with this invention has utility in various fields wherein it is desirable to provide a visual presentation of the areas of intersection of two or more cyclically-varying factors with respect to a common factor such as, for example, time. However, the invention will be described specifically with respect to a calculator designed for establishing the inter-relationship of three known biological cycles of an individual with respect to his birth date and over an extended time period.

It has been fairly well established that three biological cycles occur with mathematical regularity. One cycle, having 23 day rhythm, is believed to originate in the muscular cells or fibers and its fluctuations effect human characteristics such as physical strength, endurance, energy, resistance and physical confidence. A second cycle, having a 28 day rhythm, is related to the nervous system and its fluctuations influence such factors as feelings, creative enterprise, cooperation and all coordinations connected with the nerve system. The third cycle, having a 33 day rhythm, is believed to originate in the brain cells and its fluctuations effect functions relative to mental response, such as, memory, alertness and clarity of thinking.

The phase relationship of all three cycles, generally referred to as biorhythm cycles, have been determined to be of considerable significance. A close coincidence of the high points of all three cycles, at certain periods, would indicate that the particular individual could judiciously undertake difficult tasks requiring energy and confidence. On the other hand, a close coincidence of the low points of the cycles provides a warning to exercise mental alertness and physical relaxation during such periods.

An object of this invention is the provision of a calculator for graphically displaying the inter-relationships of a plurality of varying factors with respect to a common point of reference.

An object of this invention is the provision of a calculator for visually displaying, in a superposed manner, the phase relationships of a plurality of cyclically-varying functions when taken from a common point of reference.

An object of this invention is the provision of a calculator comprising a plurality of relatively movable members each carrying graphic representations of periodically-varying factors having a predetermined relation, and means for setting the members with respect to a selected point of reference.

An object of this invention is the provision of a calculator comprising a first member carrying reference factors, a plurality of transparent members each carrying a cyclically-varying curve and superposed over the first member, and a cursor for establishing a selected reference point for the said cyclically-varying factors with respect to the said reference factors.

An object of this invention is the provision of a calculator comprising a plurality of overlying transparent members each carrying a cyclically-varying curve, which curves are formed to be visually-distinguishable from each other, a base member disposed under the transparent members and carrying a first set of reference indicia related to the curves carried by the said transparent members, and a cursor overlying the transparent members and carrying reference factors, said cursor being provided with a window presenting to view portions and intersections of the said curves and portions of the reference indicia.

An object of this invention is the provision of a calculator for graphically presenting the phase relationships of a plurality of biorhythm curves when taken from a selected time-reference base.

An object of this invention is the provision of a biorhythm calculator comprising a base member carrying time-reference markings; a plurality of light-permeable members superposed over the base member, said members carrying cyclically-varying curves having a common zero axis but different frequencies; and means adjustable relative to all said members for the purpose of orienting predetermined reference points of the curves with respect to the said time-reference markings.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several veiws:

FIGURE 6 is a plan view of the assembled calculator, drawn to the same scale as FIGURE 1;

FIGURE 7 is a vertical, cross-sectional view taken along the line VII—VII of FIGURE 6 but with the component members drawn to an exaggerated thickness for clarity of disclosure.

Figure 1:
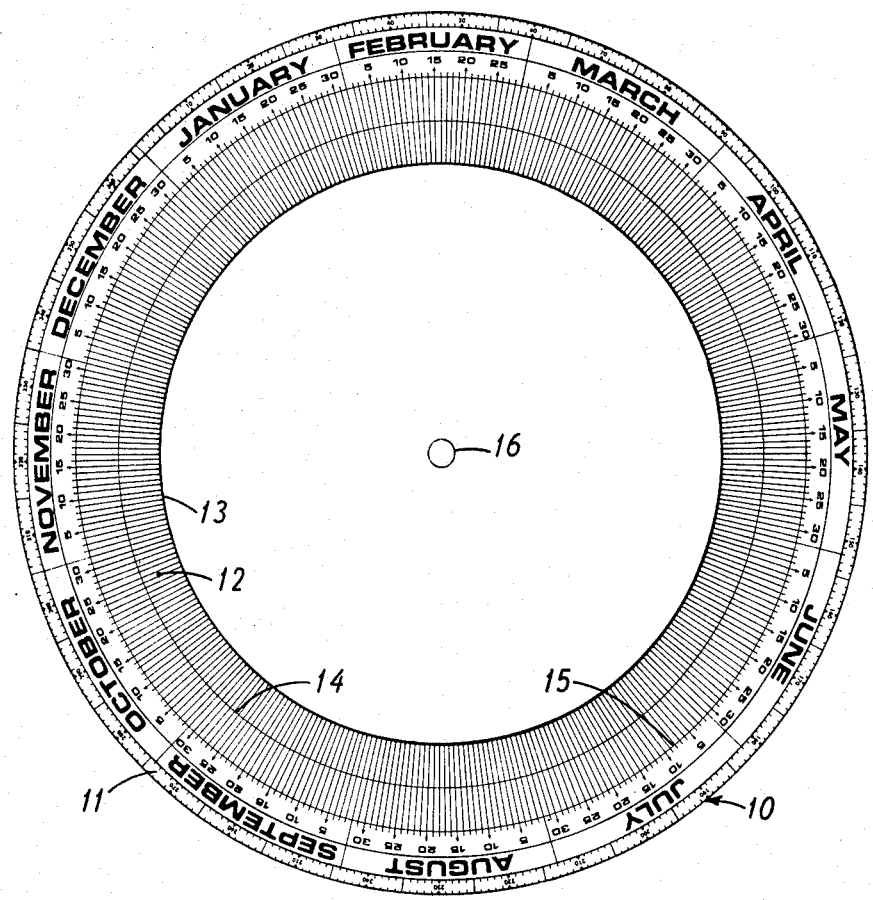
FIGURE 1 is a plan view of the circular disc which forms the base member of a calculator made in accordance with this invention.

Reference now is made to FIGURE 1 showing the base member 10 of the calculator, which member preferably is opaque and made of a suitable material (such as plastic or cardboard) and having a thickness sufficient to remain in a flat condition. The peripheral portion of the base member has printed thereon a scale 11 divided into 365 graduations and marked to indicate the number of days in a year, beginning with January 1. These graduations are extensions of the radial lines 12, and they correspond numerically to the number of days in the associated month, the angular span of each month being defined by the unbroken radial line. Thus, the first day of February is indicated as the 32nd day of the year and, of course, the last day of this month is indicated as the 60th day of the year. Every fifth day of the intervening radial lines, that is, those between the two unbroken radial lines defining the number of days in the month of February, are somewhat extended, terminate in arrows, and are marked in calendar days, the line marked "5" being February 5th, the line marked "10" being February 10th, etc.

All of the radial lines 12 terminate along an inner circle 13 and are intercepted by the circles 14 and 15, the circle 14 lying midway between the other two circles. As will be explained in more detail, hereinbelow, the radial distance between the circles 13 and 15 corresponds to the maximum and minimum points of the various curves carried by associated members of the calculator, whereas the circle 14 constitutes a zero reference line for such curves. The base member 10 is provided with a central hole 16 for receiving a suitable fastening member, such as a split rivet, by means of which the component members of the calculator are rotatably secured together.

Figure 2:
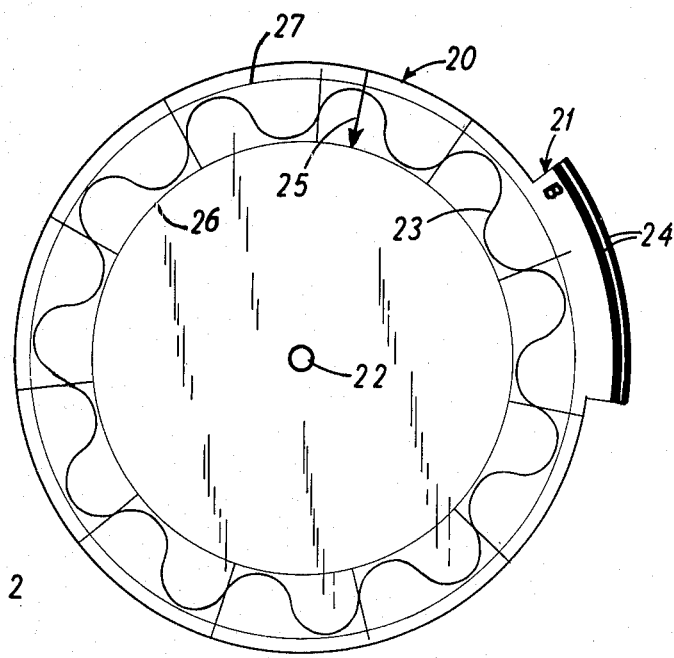
FIGURES 2–4 are similar views of the three transparent dials which are superposed in overlying relation on the base member in the assembled calculator, these figures being drawn to a smaller scale than FIGURE 1.

FIGURE 2 shows one of the transparent or translucent overlay discs 20, made of plastic and provided with an integral radially-extending tab 21 and a central hole 22. It is here pointed out that this disc has a diameter such that the circles 26 and 27 correspond, respectively, to the circles 13 and 15 shown in FIGURE 1, whereas the arcuate edge of the tab extends beyond the peripheral surface of the base member 10. Printed on the disc 20 is a sine wave 23 having a 33 day frequency, that is, corresponding to the biological curve having a 33 day rhythm. For purposes of ready identification by the user of the device, the wave 23 is formed of a solid red line, the tab 21 has printed thereon two, spaced, arcuate red bands 24 together with the letter B. The high and low points of this curve extend substantially to the circles 26 and 27. It will be apparent, then, that the center circle 14, shown in FIGURE 1, defines the zero axis of this curve. Further, the curve is so laid out that one full cycle has an arcuate length corresponding to the distance between 33 of the radial lines 12 (see FIGURE 1) measured along the zero axis circle 14. Also printed on the disc 20 is a red, radial, fiducial mark 25 terminating in an arrow.

Figure 3:
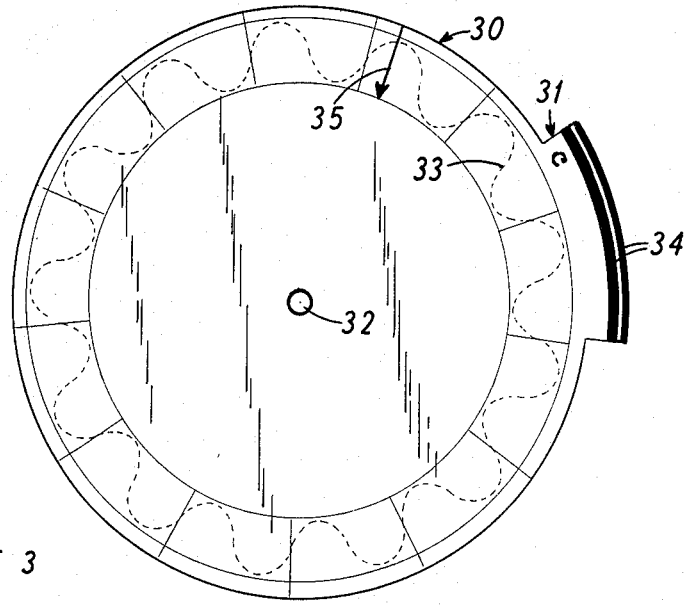

The second transparent disc 30, shown in FIGURE 3, is of the same size and shape as the above-described disc and includes the integral tab 31 and a central hole 32. This disc has printed thereon a curve 33 having a 28 day frequency, that is, corresponding to the biological curve having a 28 day rhythm. Also, for purposes of identification, the wave 33 is formed of a green broken line, the tab has printed thereon two green bands 34 and the letter C. The amplitude of the curve 33 is the same as the above-described 33 day curve and, similarly, its wave length corresponds to the distance between 28 of the radial lines 12 (see FIGURE 1) measured along the zero axis circle 14. Also, printed on the disc 30 is a green, fiducial mark 35.

Figure 4:
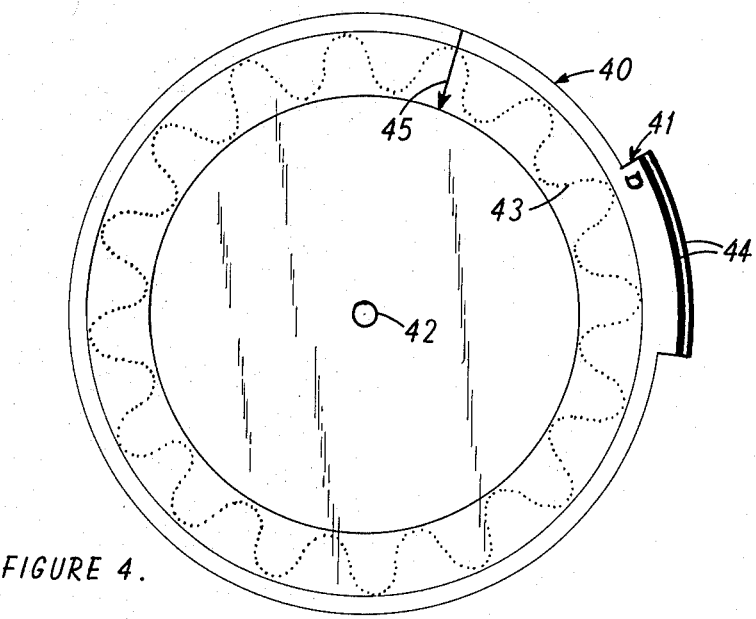

The third transparent disc 40 is shown in FIGURE 4. This disc is of the same size and shape as the other two transparent discs, being provided with the tab 41 and central hole 42. The curve 43, printed in blue dots, corresponds to the biological curve having a 23 day rhythm, and the tab 41 has printed thereon two blue bands 44 and the letter D. Also, the curve 43 has the same amplitude as the other two curves and its wave length corresponds to the distance between 23 of the radial lines (see FIGURE 1) taken along the zero axis circle 14.

Thus, it will be seen that the curves carried by the transparent discs 20, 30 and 40 have the same amplitudes but different frequencies, and that these curves are readily distinguishable from each other when the three transparent discs are superposed over each other. The fiducial marks 25, 35 and 45 also will be visible through such pile-up of the transparent discs. When the transparent discs are made of a translucent plastic, the fiducial marks may be given further distinguishing characteristics. For example, a fiducial mark can be formed of solid lines, broken lines and dotted lines corresponding to the formation of the associated curves. It will also be apparent that the curves and their associated fiducial marks can be formed of small dots, circles, squares, triangles, etc., to provide a clear, visual delineation between the matter carried on each of the discs. In any event, when the three transparent discs are superposed one over the other, a coincidence between the tops and bottoms of the curves will occur between any two or all three curves at various points taken along the common zero axis circle. The areas wherein such coincidences occur will depend upon the relative angular alignment of the discs as indicated by the setting of the respective fiducial marks. It will also be clear that when the three transparent discs are disposed over the base member, the occurrences of the coincidence points can be established with respect to a specific day of a specific month, by reference to the radial lines 12 (see FIGURE 1) underlying all three of the curves.

Figure 5:
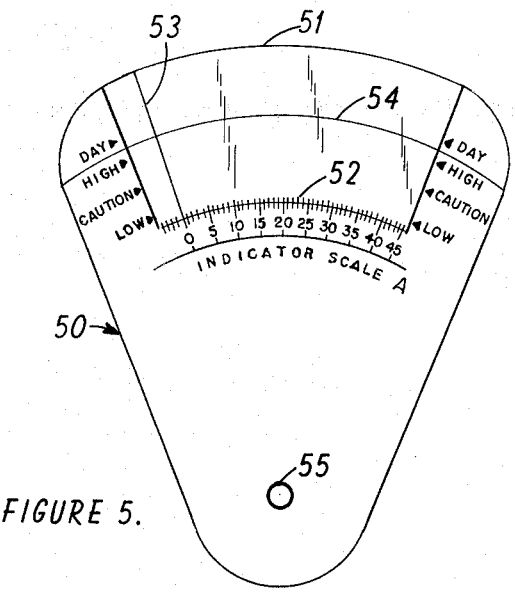
FIGURE 5 is a similar view of the cursor.

The cursor for the calculator is shown in FIGURE 5 and is identified by the numeral 50. This is a generally fan-shaped member made of an underlying opaque material, such as plastic, and having an arcuate cut-out portion extending to the peripheral surface. Cemented to the top surface of the underlying member is a sheet of clear plastic of the same general shape, which sheet extends across the cut-out portion, thereby to form a window 51. Printed on the overlying plastic sheet is a series of graduations 52 marked in days, a zero fiducial mark 53, an arcuate line 54 and various legends and directional triangles, as shown. The arc defining the lower portion of the window 51 lies on a circle having the same radius as the innermost circle 13 shown in FIGURE 1, whereas the line 54 coincides with the circle 15. The peripheral edge of the cursor lies on a radius somewhat greater than that of the base disc 10 (FIGURE 1) thereby to facilitate finger rotation of the cursor relative to the disc in the assembled calculator. The cursor is provided with a hole 55 for receiving the fastening rivet which fastens all of the calculator components together while permitting rotation of the individual members about a common axis.

Reference now is made to FIGURE 6, which is a plan view of the assembled calculator and FIGURE 7, which is a sectional view taken along the line VII—VII of FIGURE 6 but showing the component members of exaggerated thickness for clarity of disclosure. It will be seen that the transparent discs 20, 30 and 40 are superposed one over the other and such pile-up overlies the base member 10. The cursor 50 is disposed over the uppermost transparent disc 40 and the assembly is secured together by the split rivet 56. It will also be noted that the tabs 21, 31 and 41, of the respective transparent discs 20, 30 and 40, extend somewhat beyond the edge of the disc base member 10, said tabs being shown in FIGURE 6 in chance locations. The cursor 50 is readily rotatable relative to the base disc 10 by finger pressure exerted either against the body of the cursor or against the slightly extended peripheral surface thereof. In all positions of the cursor, several cycles of the curves carried by the three transparent discs, as well as portions of the information carried by the base 10, are visible through the cursor window 51.

Each of the transparent discs is relatively thin and is rotatable relative to the other members of the calculator by means of the associated radial-extending tab. In use of the device, the cursor is first set to a selected position relative to the base disc and can be retained in such position by slipping a paper clip over both members. Now, the lowermost transparent disc 20 is rotated to align its fiducial mark with a selected graduation on the cursor indicator Scale A and the disc can be retained in such position by slipping another paper clip over the tab 21 and the underlying base disc. The other two transparent discs are individually set in a similar manner. The use of the paper clips to retain the members in proper selected positions is helpful to prevent accidental displacement of the set member but within a short time the user develops sufficient dexterity to use the calculator without the aid of the clips.

The setting of the calculator to provide pertinent information for a particular individual is done with reference to a tabulation which is standard in the biological rhythm field. For reference purposes, a portion of a tabulation for use with the calculator as herein described, is presented below.

SETTINGS OF TRANSPARENT DIALS

| Age Now | Red Dial B | Green Dial C | Blue Dial D |
|---|---|---|---|
| 5  | 22 | 22 | 14 |
| 10 | 11 | 16 | 5  |
| 15 | 32 | 9  | 18 |
| 20 | 21 | 3  | 9  |
| 30 | 32 | 32 | 11 |
| 40 | 9  | 6  | 14 |
| 50 | 20 | 22 | 23 |
| 60 | 30 | 9  | 4  |
| 70 | 8  | 25 | 9  |

Figure 8:
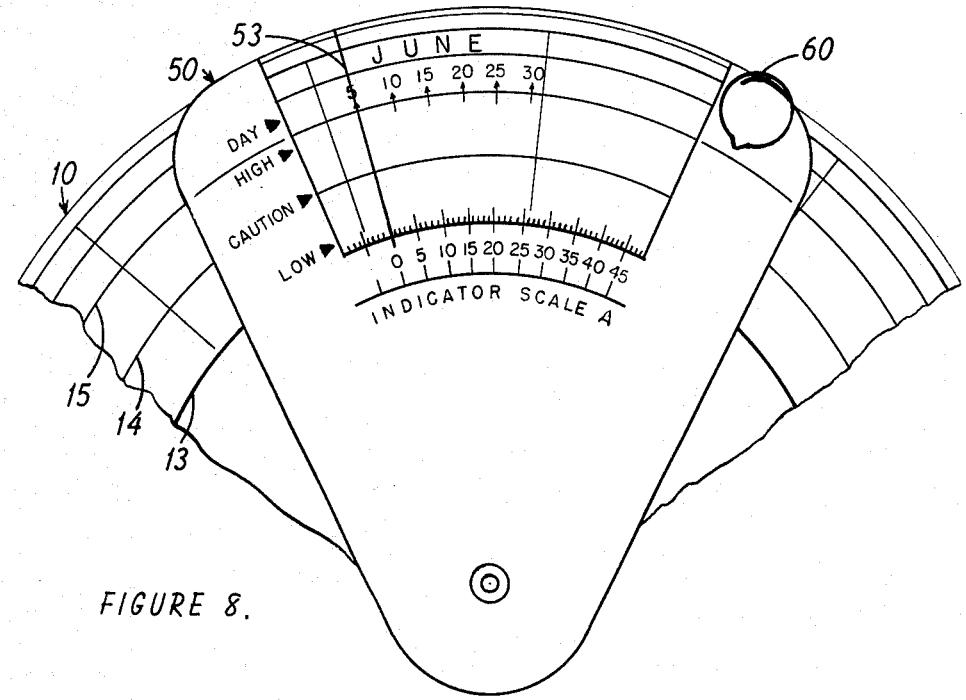
FIGURES 8–10 are enlarged fragmentary views to show how the members of the calculator are set for a specific example.

In view of the superposed disposition of the three curves (carried by the transparent discs), the underlying day markings carried by the base disc, and in the absence of color distinctions in the drawings, a specific example showing the use of the biorhythm calculator will be given with reference to the fragmentary views shown in FIGURES 8–10. In these views, there is included only such portion of the information carried by each component as is necessary to present a clear understanding of the example to be given.

It will be assumed that the particular individual now is 40 years old and his birthday is June 5th. Referring to FIGURE 8, the fiducial line 53 of the cursor 50 is aligned with the June 5 radial line carried by the base dial 10. This establishes a predetermined correlation between the calibrations of the Indicator Scale A, carried by the cursor, and the day of June 5th. The cursor is retained in the illustrated position, as by means of a paper clip 60 positioned over the cursor and base dial. Omitted from FIGURE 8 are the three transparent dials each carrying the biorhythm curves having their high and low points falling within the circles 13 and 15 printed on the base dial 10.

Figure 9:
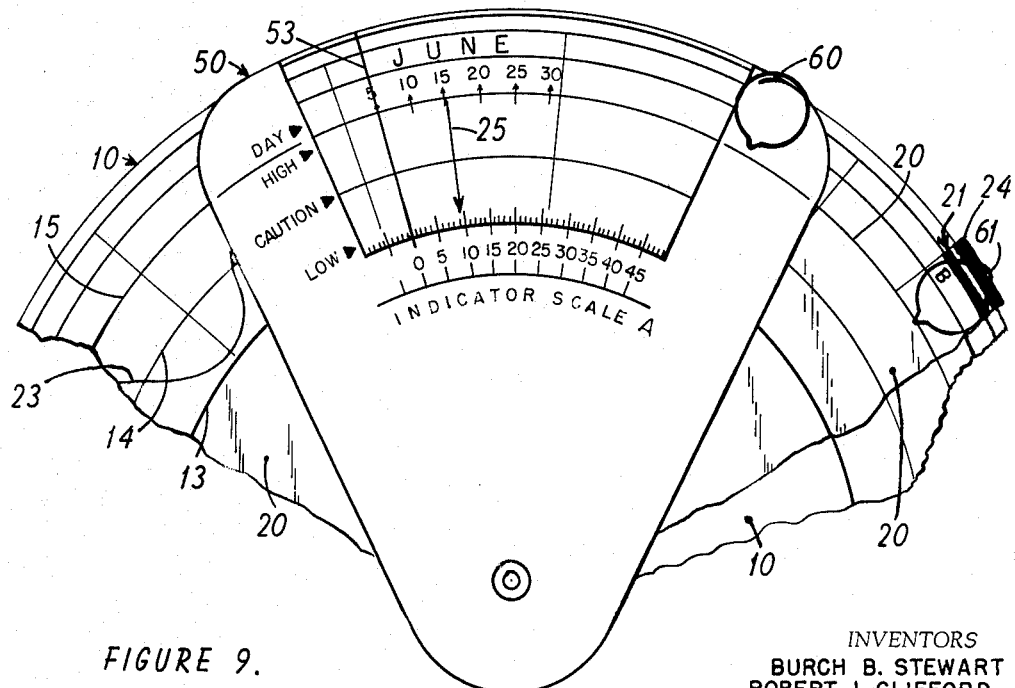

The lowermost transparent dial 20 (see also FIGURE 2) now is rotated to align its fiducial mark 25 with the 9th graduation on the cursor Indicator Scale A, as shown in FIGURE 9, the number 9 being obtained from the above tabulation in the second column headed RED DIAL B. Only a portion of the solid line, red curve 23 is shown in FIGURE 9. However, as has been described above, this curve (having the 33 day rhythm) has a length of 360 degrees, its high and low points fall within the circles 13 and 15 (printed on the base dial 10), and the line 14 constitutes the zero axis of the curve. The dial 20 now is retained in the illustrated position by means of a paper clip 61.

Similarly, each of the other two transparent dials are rotated, individually, to align their respective fiducial marks with the proper point on the cursor Indicator Scale A. Specifically, the intermediate transparent dial 30, carrying the broken line green curve 33 (see FIGURE 3) will have its fiducial mark 35 aligned with the scale graduation (6), whereas the uppermost dial 40, carrying the dotted line blue curve 43 (see FIGURE 4) will have its fiducial mark 45 aligned with the scale mark (14), the numbers (6) and (14) being obtained from the above tabulation.

Figure 10:
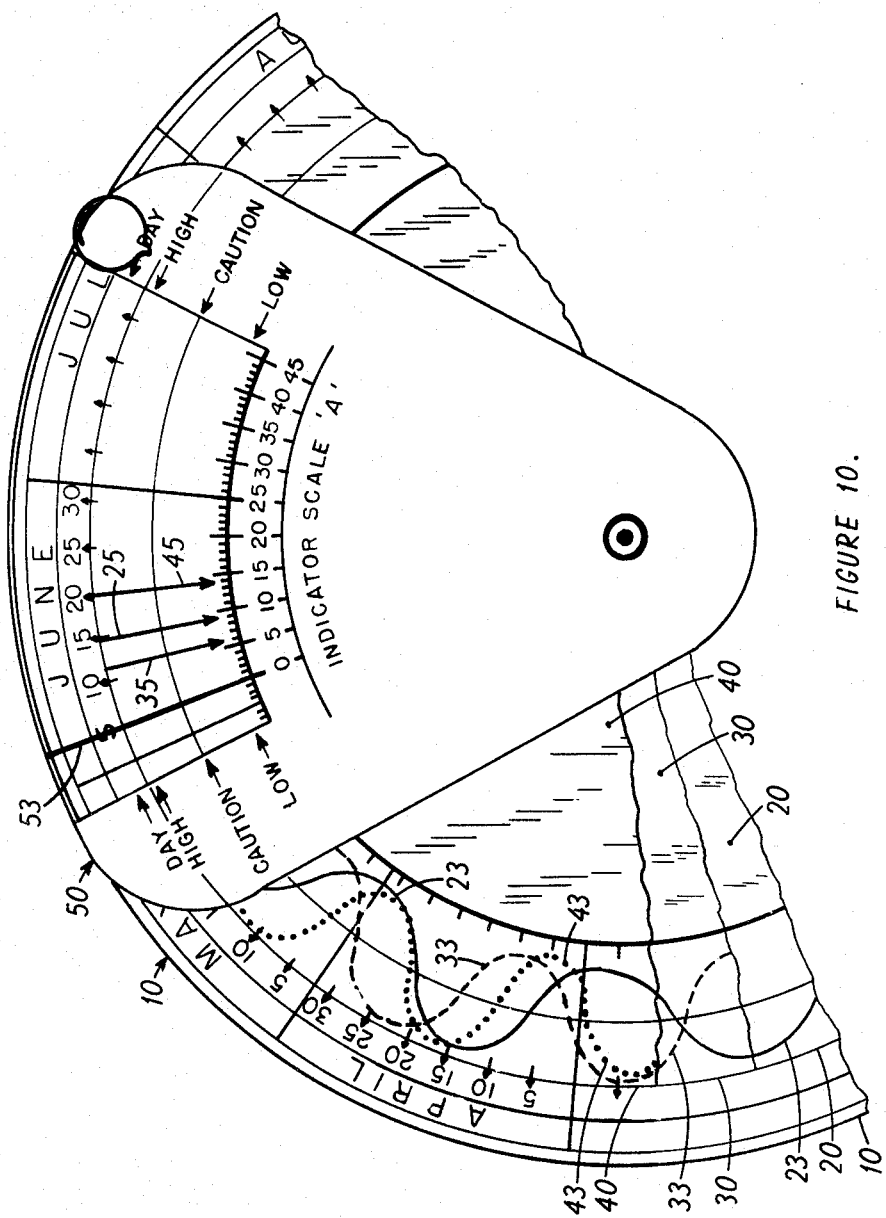

The settings of all of the fiducial marks of the transparent dials are shown in FIGURE 10. Thus, each of the curves has now been set with reference to the cursor Indicator Scale A and with reference to a selected starting point, namely, the birth date of June 5th. This establishes the phase relationship of the curves over a period of one year, and provides a visual presentation of those areas wherein the high and low points of two or three of the curves coincide. Included in FIGURE 10 are portions of the individual curves 23, 33 and 43 carried by the respective, overlying transparent dials 20, 30 and 40. It will be noted that there is a fair coincidence of the low points of the three curves occurring between April 30 and May 5. These days, for this particular individual, are those during which his mental, emotional and physical reactions are relatively low, thereby dictating the exercise of greater than normal caution when undertaking tasks the success of which involves any of the three reactions. A coincidence of the high points of all curves on a particular day, or days, would be indicative of a maximum capability of successfully undertaking tasks requiring above normal mental, emotional and physical reactions. Over a period of a year, there will appear numerous coincidence points between any two or all three of the curves, which coincidence points are established with respect to specific days of specific months. Thus, once the calculator has been set for a given individual, such individual may refer to the calculator to determine his high and low periods with respect to contemplated activities.

Having now described our invention, those skilled in this art will be able to make various changes and modifications in the illustrated construction and arrangement of the calculator. With two or more cyclically-variable functions carried individually on overlying transparent, or translucent, members it is desirable but not necessary to make the graphs for the functions readily distinguishable. Also, to facilitate use of the calculator, it is preferable to make the individual curves of equal amplitudes. In the illustrated example, the three biological curves are related, time-wise, whereby the reference factors, carried by the base dial, are presented in days or months. It will be apparent that the information carried by the relatively movable members of the calculator may comprise curves representing any functions which are inter-related by a common reference factor, other than days. These and other changes and modifications can be made without departing from the scope and spirit of the invention as set forth in the following claims.

We claim:
1. A calculator comprising,
 (a) an opaque disc base member carrying first reference markings,
 (b) a plurality of transparent disc members superposed over each other and the base member, each transparent member carrying a fiducial mark and a periodically-varying curve representing a variable factor which is related to said first reference markings,
 (c) a cursor member overlying the transparent members and having a window exposing to view a portion of said first reference markings and portions of the curves carried by the transparent disc members, said member carrying a fiducial mark and second reference markings having a predetermined relation to the said first reference markings, and
 (d) means securing together all of the said members while affording movement of each member relative to all of the other members about a common axis.

2. The invention as recited in claim 1, wherein each of the said curves are formed in a manner visually distinguishable from each of the other curves.

3. The invention as recited in claim 2, wherein the said first reference markings are radial lines equally spaced over 360 degrees and terminate along an inner circle coinciding with the arc defining the said one edge of the window.

4. A calculator comprising,
 (a) a base disc carrying inner and outer circles, spaced radial lines extending between said inner and outer circles, and legends representing calendar months and days,
 (b) a first transparent disc disposed over the base disc, said disc carrying a radial fiducial mark and a first cyclically-varying curve having a length of 360 degrees,
 (c) a second transparent disc disposed over the first transparent disc, said disc carrying a radial fiducial mark and a second cyclically-varying curve having a length of 360 degrees,
 (d) a third transparent disc disposed over the second transparent disc, said disc carrying a radial fiducial mark and a third cyclically-varying curve having a length of 360 degrees, (e) a cursor disposed over the third transparent disc and having a window formed therein, which window has an arcuate edge coinciding with the inner circle on the base disc, said cursor having radial graduations formed along the said arcuate edge and a radial fiducial mark, and (f) means securing together the cursor and all of the discs for rotation about a common axis, the recited arrangement being such that the fiducial mark of the cursor is alignable with a selected radial line on the base disc, and the fiducial marks of the transparent discs are individually alignable with selected radial graduations on the cursor.

5. The invention as recited in claim 4, wherein each of said transparent discs has a diameter substantially coinciding with the outer circle of the base disc, and wherein each transparent disc includes an intgeral, radially-extending tab extending substantially to the peripheral surface of the opaque disc.

6. The invention as recited in claim 4, wherein each curve is formed in a manner to be visually distinct from each of the other curves.

7. The invention as recited in claim 4, wherein each of the said curves have equal amplitudes with the high and low points corresponding respectively to the said outer and inner circles of the base disc, and wherein the said base disc carries an intermediate circle equally spaced from the inner and outer circles, said intermediate circle constituting the zero axis for all of the said curves.

8. The invention as recited in claim 7, wherein the said three curves are biorhythem curves having different frequencies measured in days.

References Cited by the Examiner
UNITED STATES PATENTS

| 2,437,621 | 3/1948 | Strate | 235—78 |
| 3,084,858 | 4/1963 | Clapp | 235—84 |

LEO SMILOW, *Primary Examiner.*

C. G. COVELL, *Assistant Examiner.*